US008676157B2

(12) United States Patent
Nakamura

(10) Patent No.: US 8,676,157 B2
(45) Date of Patent: Mar. 18, 2014

(54) WIRELESS NETWORK SYSTEM

(75) Inventor: Yasufumi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 11/702,038

(22) Filed: Feb. 2, 2007

(65) Prior Publication Data

US 2007/0143391 A1 Jun. 21, 2007

Related U.S. Application Data

(63) Continuation of application No. PCT/JP2004/012018, filed on Aug. 20, 2004.

(51) Int. Cl.
  *H04M 1/66* (2006.01)
(52) U.S. Cl.
  USPC .......................................... 455/410
(58) Field of Classification Search
  USPC .......... 709/200, 228, 206; 455/418, 410, 509; 370/338, 328; 713/163
  See application file for complete search history.

(56) References Cited

U.S. PATENT DOCUMENTS

| 5,740,160 | A * | 4/1998 | Ikegami et al. ............... 370/255 |
| 6,370,381 | B1 * | 4/2002 | Minnick et al. ............... 455/445 |
| 6,839,331 | B2 * | 1/2005 | Rudnick ....................... 370/312 |
| 6,917,964 | B2 * | 7/2005 | Kita et al. ..................... 709/204 |
| 7,024,553 | B1 * | 4/2006 | Morimoto ..................... 713/163 |
| 7,120,129 | B2 * | 10/2006 | Ayyagari et al. .............. 370/255 |
| 7,177,957 | B2 * | 2/2007 | Vance ............................. 710/13 |
| 7,512,081 | B2 * | 3/2009 | Ayyagari et al. .............. 370/255 |

| 2002/0118664 | A1 | 8/2002 | Ishibashi et al. |
| 2002/0131371 | A1 * | 9/2002 | Rudnick ....................... 370/252 |
| 2002/0147819 | A1 * | 10/2002 | Miyakoshi et al. .......... 709/228 |

(Continued)

FOREIGN PATENT DOCUMENTS

| EP | 1 309 127 A1 | 5/2003 |
| GB | 2429610 A | 2/2007 |

(Continued)

OTHER PUBLICATIONS

Translation of the relevant parts of the Official Action issued by the German Patent and Trademark Office in corresponding Official File No. 11 2004 002 946.5 dated Dec. 5, 2011.

(Continued)

*Primary Examiner* — Jinsong Hu
*Assistant Examiner* — Nathan Taylor
(74) *Attorney, Agent, or Firm* — Smith, Gambrell & Russell, LLP

(57) ABSTRACT

A wireless network system wherein just inputting information regarding new wireless network settings from one client system enables the wireless network settings in the wireless network wireless communication control system and all of the client systems to be synchronously changed. The wireless communication control system is provided with a setting change instruction unit transmitting setting change instructions to all of the client systems based on a setting change request of the wireless network from a single client system and a wireless communication control system side setting content update unit updating the wireless network setting content in the wireless communication control system in synchronization with the processing of the setting change instruction unit. Each of the client systems is provided with a setting change instruction reception unit receiving a setting change instruction from the setting change instruction unit and a client system side setting content update unit updating the wireless network setting content in the client system based on the setting change instruction received by the setting change instruction reception unit.

20 Claims, 14 Drawing Sheets

(56) References Cited

U.S. PATENT DOCUMENTS

| | | | |
|---|---|---|---|
| 2003/0035399 A1* | 2/2003 | Ishibashi et al. | 370/338 |
| 2003/0063592 A1 | 4/2003 | Seki et al. | |
| 2003/0091015 A1 | 5/2003 | Gassho et al. | |
| 2003/0187963 A1 | 10/2003 | Tsai et al. | |
| 2003/0224812 A1* | 12/2003 | Gassho et al. | 455/509 |
| 2004/0264427 A1* | 12/2004 | Jaakkola et al. | 370/338 |
| 2005/0198233 A1* | 9/2005 | Manchester et al. | 709/221 |
| 2005/0267943 A1* | 12/2005 | Castaldi et al. | 709/206 |
| 2006/0056344 A1* | 3/2006 | Roy et al. | 370/329 |

FOREIGN PATENT DOCUMENTS

| | | |
|---|---|---|
| JP | 08181681 A | 7/1996 |
| JP | 08242245 A | 9/1996 |
| JP | 08242246 A | 9/1996 |
| JP | 2655117 B2 | 5/1997 |
| JP | 10271120 A | 10/1998 |
| JP | 11308673 A | 11/1999 |
| JP | 2001111543 A | 4/2001 |
| JP | 2001-197069 A | 7/2001 |
| JP | 2002252620 A | 9/2002 |
| JP | 2002359623 A | 12/2002 |
| JP | 2003046514 A | 2/2003 |
| JP | 2003-070061 A | 3/2003 |
| JP | 2003101546 A | 4/2003 |
| JP | 2003110572 A | 4/2003 |
| JP | 2003143156 A | 5/2003 |
| JP | 2003-258790 A | 9/2003 |
| JP | 2003283481 | 10/2003 |
| WO | 2005104459 A1 | 11/2005 |

OTHER PUBLICATIONS

Japanese Notice of Reasons of Rejection dated Feb. 14, 2012 issued in application No. 2010-008392.

Non-Final Office Action dated Apr. 27, 2012 received in U.S. Appl. No. 13/341,127.

Japanese Office Action dated Jun. 25, 2013 received in corresponding Japanese Patent Application No. 2011-286500.

Non-final Office Action dated May 15, 2013 received in U.S. Appl. No. 13/341,127.

Final Office Action dated Sep. 28, 2012 received in U.S. Appl. No. 13/341,127.

Notice of Allowance dated Dec. 5, 2013 received in U.S. Appl. No. 13/341,127.

* cited by examiner

FIG. 4

REGISTERED CLIENT DATABASE

| ID | CLIENT NAME | MAC ADDRESS |
|---|---|---|
| 1 | Spring | 00:00:0E:01:01:01 |
| 2 | Summer | 00:00:0E:02:02:02 |
| 3 | Fall | 00:00:0E:01:02:03 |

FIG. 5

| HEADER SHOWING FACT OF BEING SETTING CHANGE REQUEST | DETAILED SETTING CONTENT DATA |
|---|---|

FIG.10

| HEADER SHOWING FACT OF BEING NOTIFICATION OF SETTING CHANGE TIMING | SETTING CHANGE TIMING DATA |
|---|---|
| | 2004/3/9 16:30:00 |

FIG.11

SETTING CHANGE HISTORY DB

| HISTORY ID | SETTING CHANGE TIMING | SSID | ENCRYPTION SCHEME | WEP KEY | KEY NUMBER | SUCCESSFUL CLIENT NAMES | FAILED CLIENT NAMES |
|---|---|---|---|---|---|---|---|
| 1 | 2003/12/20 13:00:00 | FNetwork1 | 128bit ASCII | AnekdKKe1193na11 | 1 | Spring Summer Fall | |
| 2 | 2004/1/5 11:00:00 | FNetwork2 | 128bit ASCII | KdeKeate0021933 | 1 | Spring Summer Fall | |
| 3 | 2004/2/10 11:00:00 | FNetwork3 | 128bit ASCII | 00992288dkeiddKa | 2 | Spring Summer Fall | |
| 4 | 2004/3/9 11:00:00 | FNetwork4 | 128bit ASCII | Zai19n3naa0092ke | 3 | Spring Summer | Fall |

FIG.13

SETTING CHANGE HISTORY LIST

| CLIENT NAME | CURRENT SETTING CHANGE 2004/3/9 11:00.00 | ONE SETTING CHANGE BEFORE 2004/2/10 11:00.00 | TWO SETTING CHANGES BEFORE 2004/1/5 11:00.00 | THREE SETTING CHANGES BEFORE 2003/12/20 13:00.00 |
|---|---|---|---|---|
| Spring | SUCCESSFUL | SUCCESSFUL | SUCCESSFUL | SUCCESSFUL |
| Summer | SUCCESSFUL | SUCCESSFUL | SUCCESSFUL | SUCCESSFUL |
| Fall | FAILED | SUCCESSFUL | SUCCESSFUL | SUCCESSFUL |
| SETTING CHANGE | | | | |

FIG. 16

REGISTERED CLIENT LIST

| CLIENT NAME | CURRENT STATE | RESULTS OF LAST SETTING CHANGE |
|---|---|---|
| Spring | CONNECTED | SUCCESSFUL |
| Summer | DISCONNECTED | SUCCESSFUL |
| Fall | DISCONNECTED | FAILED |

WIRELESS NETWORK SYSTEM

CROSS-REFERENCE TO RELATED APPLICATIONS

This application is a continuation of PCT/JP2004/012018, filed on Aug. 20, 2004, the contents being incorporated herein by references.

TECHNICAL FIELD

The present invention relates to a wireless LAN (Local Area Network) system connected through an access point to a plurality of client systems.

BACKGROUND ART

In recent years, there has been a boom in the construction of networks using wireless LANs. Technical standards for interconnection of wireless LANs such as the IEEE802.11a, IEEE802.11b, and IEEE802.11g have successively been established. Manufacturers are now supplying products based on these. The fact that inexpensive, simple realization of wireless connection at practical speeds has become possible is spurring on the spread of these.

When building a network using wireless LANs, which standard to base the connections on is selected and an ID unique to the network, called a "SSID (Service Set Identifier)", and information for encrypting the data, called a "WEP (Wired Equivalent Privacy) key", are set.

Wireless LAN equipment of the same standards can of course by connected with each other, but there is no compatibility between the IEEE802.11a and IEEE802.11b or IEEE802.11g, so mutual communication is not possible. IEEE802.11g has a compatibility mode with the IEEE802.11b, but mutual communication is possible only in the compatibility mode.

If the SSID is not the same, equipment cannot be connected to the network.

The WEP key is used to encrypt the data transferred between terminals linked by the same SSID. By encrypting the data, it is possible to prevent the content of the data being transferred from being revealed despite connection itself being made. This is effective in terms of security, so setting a WEP key is recommended. As the length of the word used as the WEP key, 64 bits, 128 bits, 152 bits, etc. can be set. Further, as many as four keys may be stored. Unless even the information as to which number key to use is exactly the same, the encryption cannot be reversed in this system.

In this way, to connect wireless LAN equipment, various parameters must be made the same. For the method for changing these parameters, due to the fact that the connection is broken when the settings are changed, up until now one of the following methods has been used.

In a first method, the settings of the wireless LAN access point (called the "wireless LAN station") are entered, then the settings of the client systems (personal computers) in the network are changed manually one system at a time. Note that a "wireless LAN access point" is provided with a wireless LAN interface and a wired LAN interface and provides a relay function for communication among wireless LAN terminals and a relay function for communication between a wireless LAN terminal and a wired LAN terminal.

In a second method, a client system starts up a setting software. When this happens, the settings of that client system and the settings of the access point are simultaneously changed. However, the settings of the other client systems are not synchronously changed, so those settings have to be changed manually.

Due to the large number of setting items, if manually setting all of the items of the wireless LAN equipment to be connected to the network, the setting operation would become tremendously troublesome. If it were possible to simultaneously set all of the client systems in a network, this setting work could be considerably reduced. At the present time, however, such technology has not been provided.

Note as a prior art document relating to settings of a wireless LAN, the following Patent Document 1 discloses the technique of enabling equipment not provided with abundant input interfaces to be connected to the wireless LAN by adding functions as an access point to the equipment to be added.

Further, the following Patent Document 2 discloses a wireless LAN using a frequency hopping type of a spread spectrum wireless transmission and reception system wherein resynchronization is performed swiftly and reliably when the frequency synchronization is lost once under frequency hopping control.

Patent Document 1: Japanese Patent Publication (A) No. 2003-143156

Patent Document 2: Japanese Patent Publication (A) No. 8-181681

DISCLOSURE OF THE INVENTION

The present invention was made in consideration of the above problems and has as its object the provision of a wireless network system wherein just inputting information regarding new wireless network settings from one client system enables the wireless network settings in the wireless network wireless communication control system and all of the client systems to be synchronously changed.

To achieve the above object, according to a first aspect of the present invention, there is provided a wireless network system where a plurality of client systems are connected through a wireless communication control system, wherein the wireless communication control system is provided with a setting change instruction unit transmitting setting change instructions to all of the client systems based on a setting change request of the wireless network from a single client system and a wireless communication control system side setting content update unit updating the wireless network setting content in the wireless communication control system in synchronization with the processing of the setting change instruction unit, and each of the client systems is provided with a setting change instruction reception unit receiving a setting change instruction from the setting change instruction unit and a client system side setting content update unit updating the wireless network setting content in the client system based on the setting change instruction received by the setting change instruction reception unit.

Further, according to the present invention, preferably an instruction for change by the setting change instruction unit is performed by first transmitting a notification of setting change content, then waiting until all of the client systems have responded or a predetermined time has elapsed, then sending a notification of setting change timing.

Further, according to the present invention, preferably the wireless communication control system is further provided with a setting change history management unit managing setting change timings and success of setting changes at the client systems for each of the setting change timings as setting change history information.

Further, according to the present invention, preferably the setting change history management unit is provided with a setting change history displaying means for displaying a list of setting change history information on a display system of a client system.

Further, according to the present invention, preferably the setting change history management unit is provided with a setting change retrying means for executing processing for changing settings for a client system failed to be changed in settings in accordance with an input operation on a display screen of the list of setting change history information.

Further, according to the present invention, preferably the setting change retrying means executes setting change processing after returning the wireless network setting content in the wireless communication control system to the wireless network setting content in the client system failed to be changed in settings.

Further, according to the present invention, preferably the wireless communication control system is further provided with a registered client list display unit displaying on a display system of a client system a registered client list showing the current connection state and the results of the last setting change for all of the client systems.

Further, according to the present invention, there is provided a wireless communication control system in a wireless network to which a plurality of client systems are connected, the wireless communication control system provided with a setting change instruction unit sending a setting change instruction to all of the client systems based on a setting change request of the wireless network from a single client system and a wireless communication control system side setting content update unit updating the wireless network setting content in the wireless communication control system in synchronization with the processing of the setting change instruction unit.

Further, according to the present invention, there is provided a client system connected to a wireless network through a wireless communication control system, the client system provided with a setting change instruction reception unit receiving a setting change instruction from the wireless communication control system and a client system side setting content update unit updating wireless network setting content in its own client system based on a setting change instruction received by the setting change instruction reception unit.

Further, according to the present invention, there is provided a program to be run by a wireless communication control system in a wireless network to which a plurality of client systems are connected, the program making the wireless communication control system function as a setting change instruction unit transmitting setting change instructions to all of the client systems based on a setting change request of the wireless network from a single client system and a wireless communication control system side setting content update unit updating the wireless network setting content in the wireless communication control system in synchronization with the processing of the setting change instruction unit.

In the wireless network system according to the present invention, when changing the settings of the wireless network, the settings of all of the connected network equipment are changed by one setting operation, so the setting work is reduced.

Further, the present invention stores the history of setting changes and enables the current latest settings to be automatically derived even for terminals not connected at the time of the setting changes.

Further, the present invention can display a list of terminals for which settings were not changed at the time of the setting changes due to temporary deterioration of the signal environment along with information on the failure of setting changes so as to reliably avoid a situation where the user does not notice the failure of settings.

BRIEF DESCRIPTION OF THE FIGURES

FIG. 4 is a view illustrating the data structure of a registered client database.

FIG. 5 is a view illustrating the data structure of a setting change request.

FIG. 10 is a view illustrating the data structure of a notification of setting change timing.

FIG. 11 is a view illustrating the data structure of a setting change history database.

FIG. 13 is a view illustrating the list of the setting change history.

FIG. 16 is a view illustrating a list of registered clients.

BEST MODE FOR WORKING THE INVENTION

Below, a wireless LAN system of one embodiment of a wireless network system according to the present invention will be explained with reference to the attached drawings.

Figure 1:
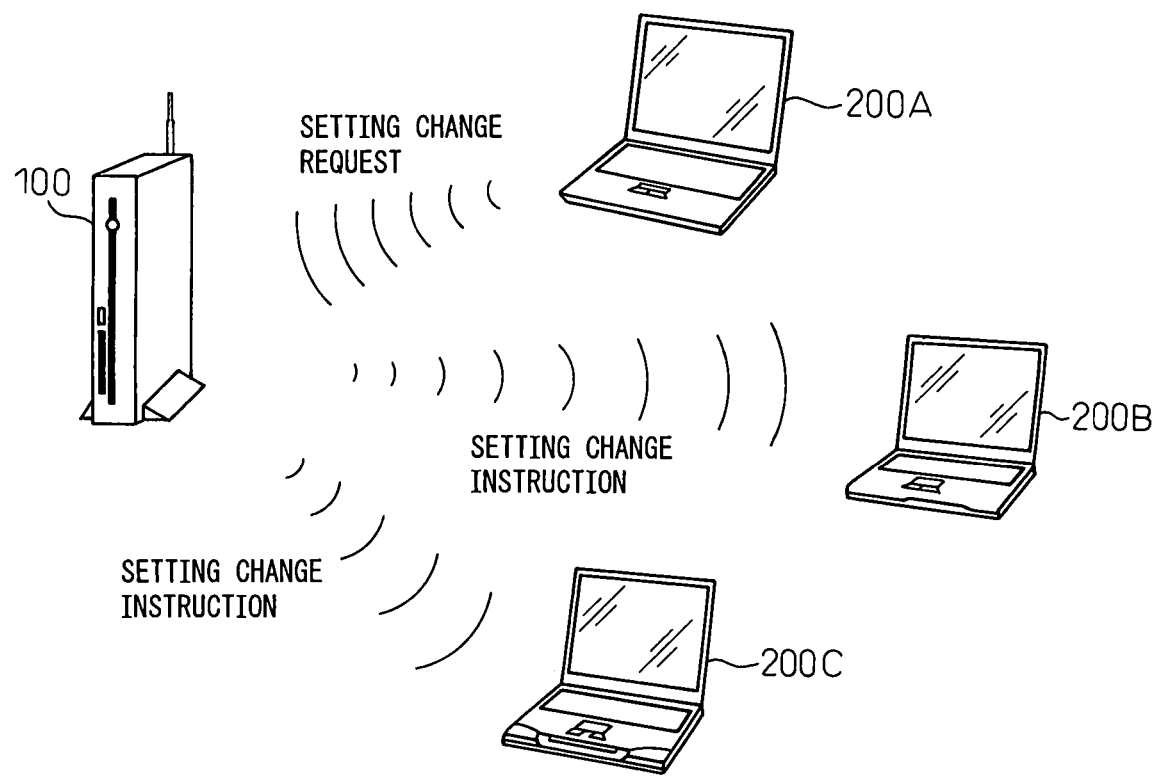
FIG. 1 is a view showing the basic concept of the present invention.

FIG. 1 is a view showing the basic concept of the present invention. For example, when a client system 200A requests a change in the settings of a wireless LAN to a wireless communication control system constituted by a wireless LAN access point 100, the settings of the wireless LAN at the other client systems 200B and 200C present in the network are also automatically changed linked with them based on setting change instructions from the access point 100. As a result, by just a user performing one setting change operation, the settings of the entire network can be changed.

Further, even when trying to later connect a client system which had been powered down at the time of the change of settings and which had not been connected, the processing for changing settings is automatically executed based on the history of change. Below, the specific method of realizing this will be explained.

Figure 2:
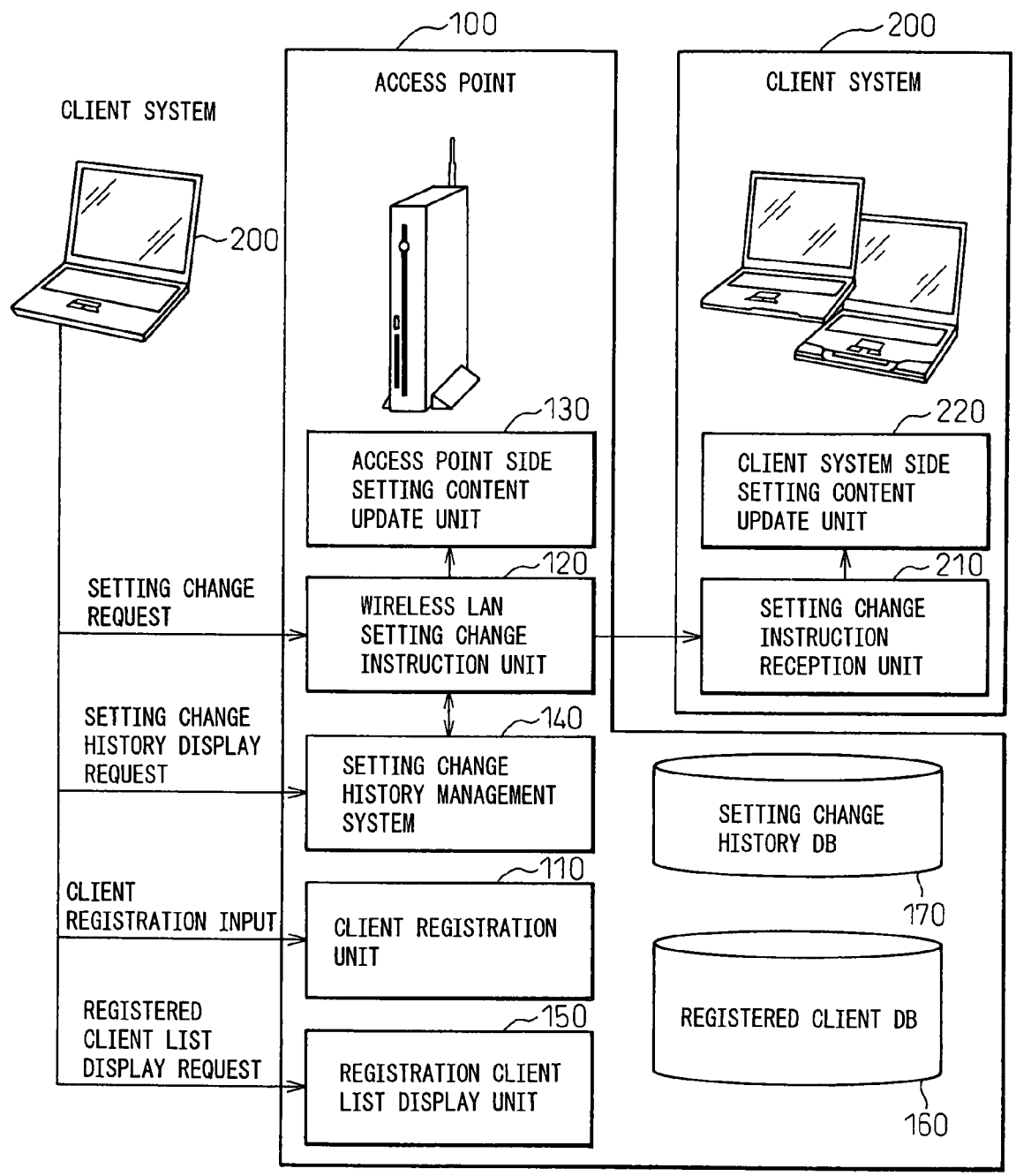
FIG. 2 is a block diagram showing the overall configuration of a wireless LAN system as one embodiment of a wireless network system according to the present invention.

FIG. 2 is a block diagram showing the overall configuration of a wireless LAN system as one embodiment of a wireless network system according to the present invention. This wireless LAN system is provided with a wireless communication control system constituted by a wireless LAN access point 100 and a plurality of client systems 200. The access point 100 and client systems 200 are provided with processors, memories, etc. A processor runs software so as to realize the functional component shown in the figures.

That is, the access point 100 is provided with a client registration unit 110, a wireless LAN setting change instruction unit 120, an access point side setting content update unit 130, a setting change history management unit 140, a registered client list display unit 150, a registered client database 160, and a setting change history database 170.

Here, the client registration unit 110 executes processing for registering in the registered client database 160 information relating to a client system for allowing connection in accordance with input by a user at any client system 200.

Further, the wireless LAN setting change instruction unit 120 performs processing for instructing a change to the request setting content to the access point side setting content update unit 130 and all of the client systems 200 upon receiving a setting change request from the client system 200.

Further, the access point side setting content update unit 130 performs processing for updating the wireless LAN setting content in the wireless LAN access point 100 upon receiving an instruction from the wireless LAN setting change instruction unit 120.

Further, the setting change history management unit 140 performs processing for managing the setting change timings and the success of the setting changes at the client systems as the setting change history information on the setting change history database 170 and performs processing for displaying the setting change history list upon receiving a setting change history display request from the client system 200.

Further, the registered client list display unit 150 performs processing for displaying a registered client list showing the current connection state and the results of the latest setting change for all of the client systems upon receiving a registered client list display request from the client system 200 based on the information stored in the registered client database 160 and setting change history database 170.

On the other hand, each client system 200 is provided with a setting change instruction reception unit 210 and a client system side setting content update unit 220. Here, the setting change instruction reception unit 210 performs processing for receiving a setting change instruction from a wireless LAN setting change instruction unit 120 in the access point 100. Further, the client system side setting content update unit 220 performs processing for updating the wireless LAN setting content in the client system 200 based on the setting change instruction received by the setting change instruction reception unit 210.

Figure 3:
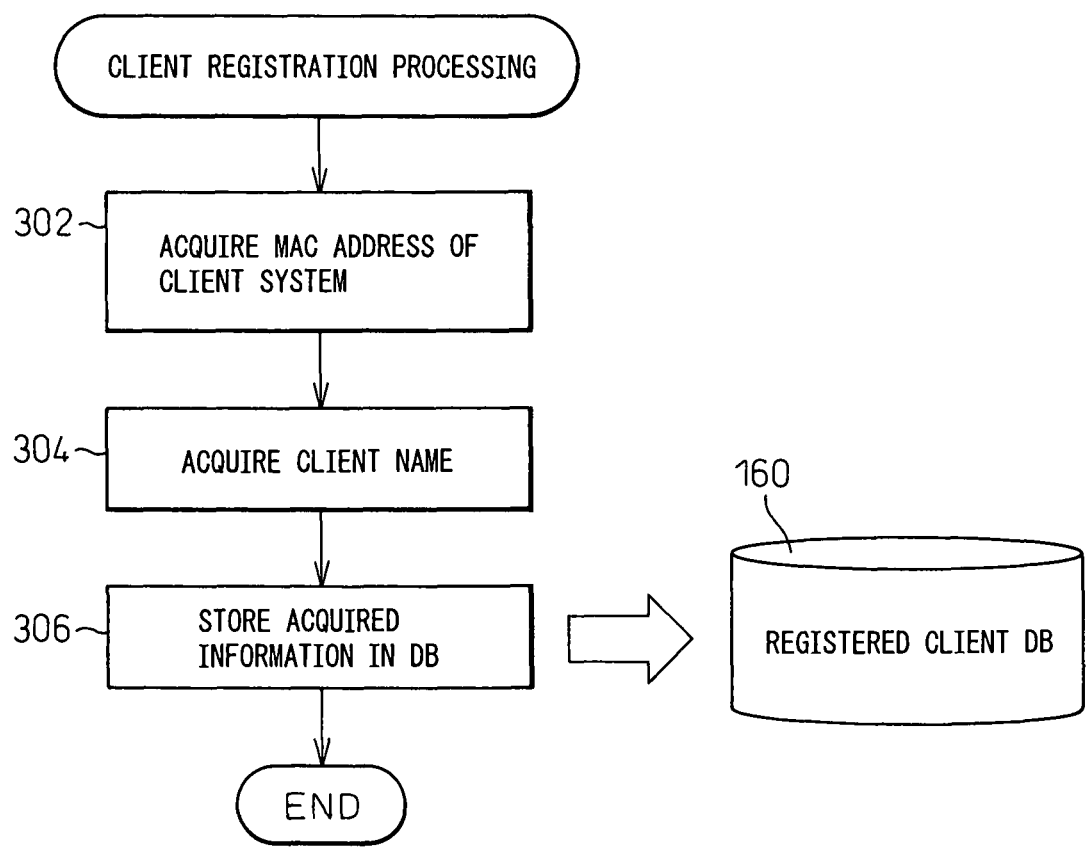
FIG. 3 is a flow chart showing the routine of the processing according to a client registration unit in the access point.

Below, the processing at each part will be explained in brief. First, the registration processing of the client system will be explained. FIG. 3 is a flow chart showing the routine of the client registration processing at the client registration unit 110 in the access point 100. When newly connecting a client system to the network, the client system must be registered at the access point. This registration processing is realized by the client registration unit 110 in the access point 100 storing the client system information in the registered client database 160 based on the user input operation at any client system 200. Note that as the information for identifying a client system, a physical address unique to the network equipment, that is, the MAC (Media Access Control) address, is used.

First, at step 302, the client registration unit 110 acquires the MAC address of the client system to be registered based on the input operation of the user. Next, at step 304, the client registration unit 110 prompts the user to input the client name so as to obtain the client name. At the last step 306, the client registration unit 110 stores the acquired information in the registered client database 160.

The data structure of the registered client database 160 built by this client registration processing is illustrated in FIG. 4. As shown in the figure, the registered client database 160 stores the items of the ID (Identifier), client name, and MAC address for exactly the number of client systems. Note that the ID is unambiguously assigned for management in the access point 100.

Next, the processing for changing the settings of a wireless LAN will be explained. This processing is started by any client system 200 sending the access point 100 a setting change request and the wireless LAN setting change instruction unit 120 in the access point 100 being started.

Figure 6:
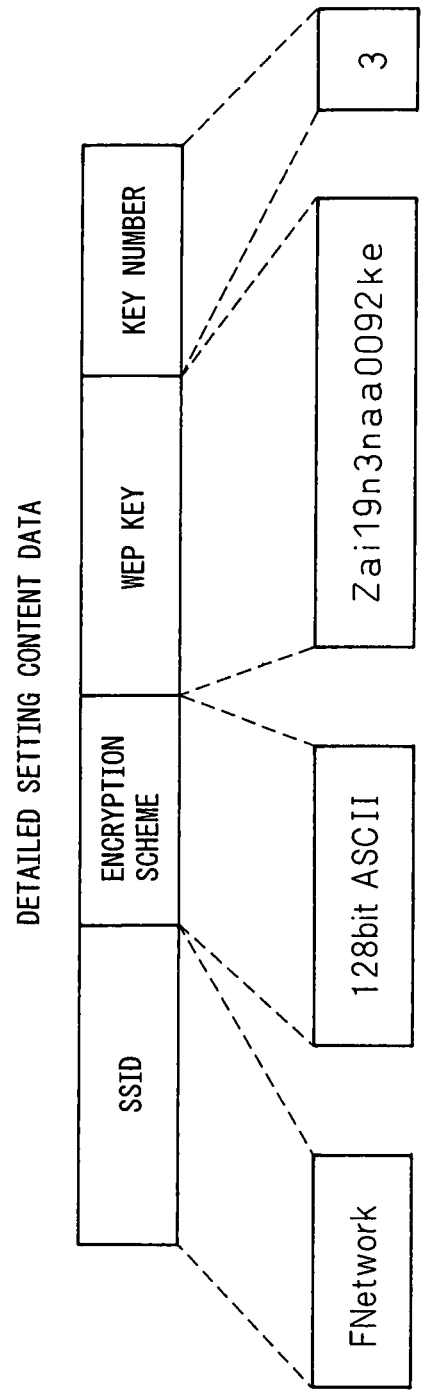
FIG. 6 is a view illustrating detailed setting content data.

The data structure of the setting change request is shown in FIG. 5. As shown in the figure, the setting change request is comprised of a header showing that this is a setting change request and detailed setting content data specifying the content of the settings to be newly employed. Further, the detailed setting content data, as shown in FIG. 6, as comprised of a SSID, encryption scheme, WEP key, and key number.

Figure 7:
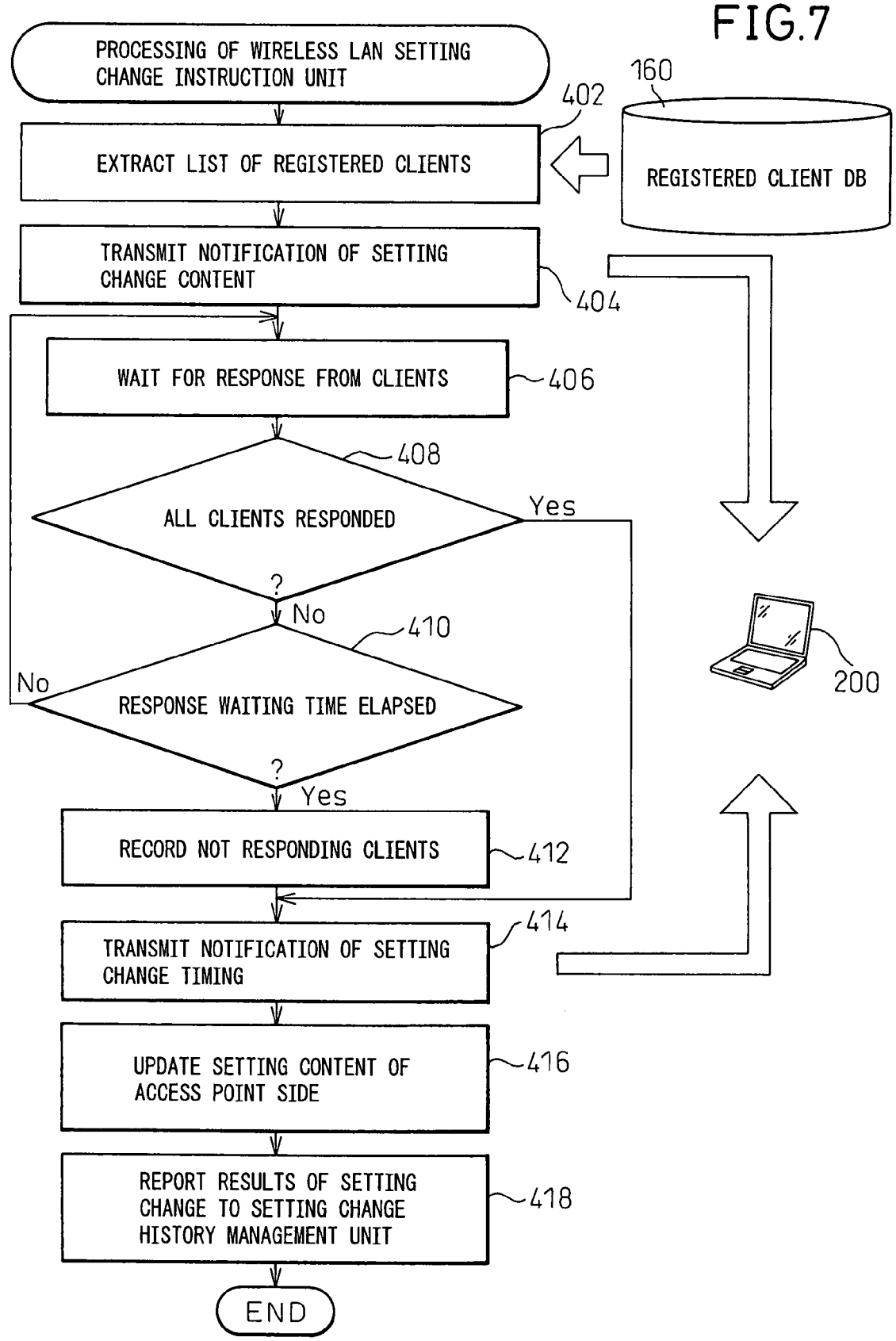
FIG. 7 is a flow chart showing the routine of the processing by a wireless LAN setting change instruction unit in the access point.

The routine of the processing executed by the wireless LAN setting change instruction unit 120 upon receiving this setting change request is shown by the flow chart of FIG. 7. First, at step 402, a list of registered clients is extracted from the registered client database 160 (FIG. 4).

Figure 8:
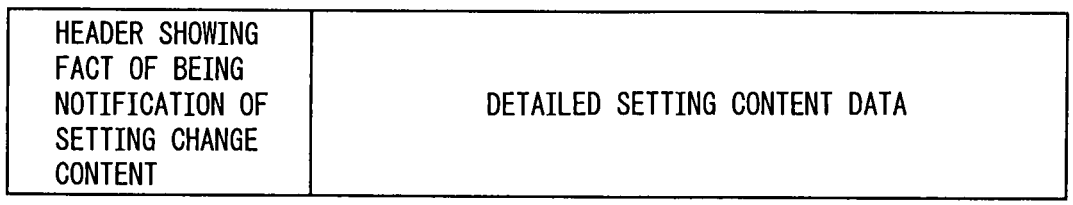
FIG. 8 is a view illustrating the data structure of a notification of setting change content.

Next, at step 404, based on the extracted registered client list, all of the client systems 200 are sent notifications of setting change content. The data structure of the notification of setting change content is shown in FIG. 8. As shown in the figure, the notification of setting change content is comprised of a header showing the notification of setting change content and the detailed setting content data specifying the content of the settings to be newly employed. The detailed setting content data is the same as that shown in FIG. 6.

Figure 9:
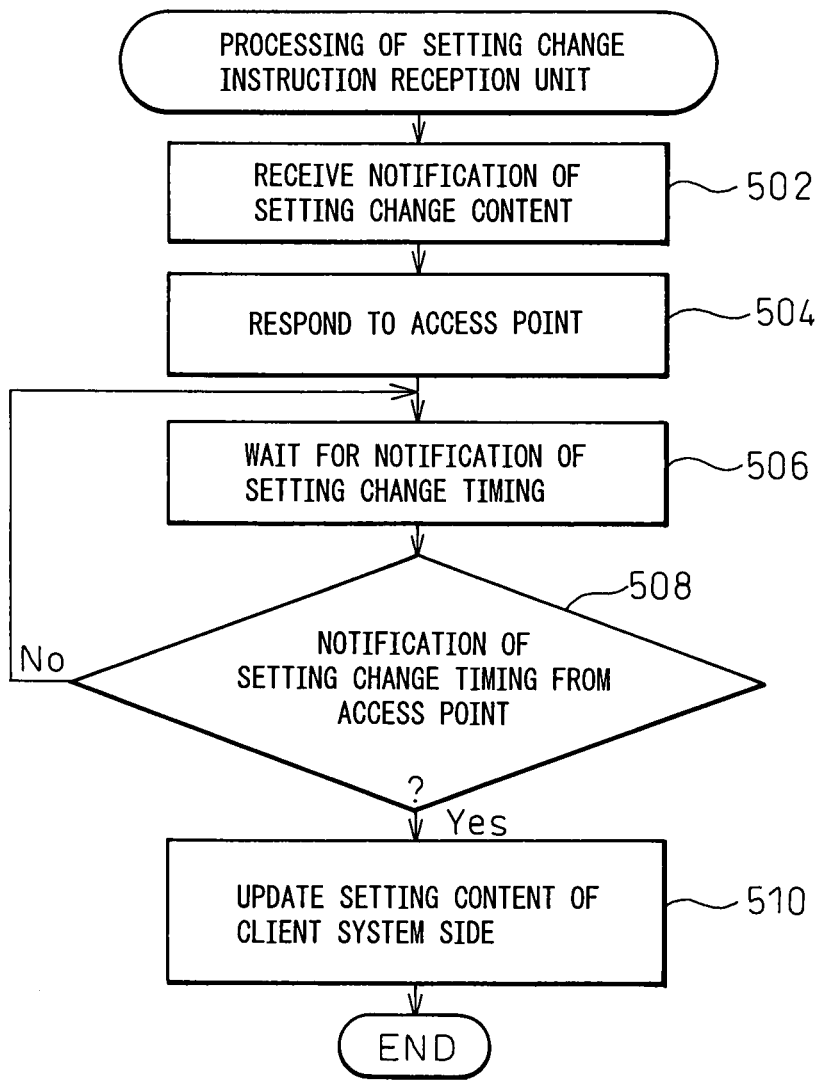
FIG. 9 is a flow chart showing the routine of the processing by a setting change instruction reception unit in the client system.

On the other hand, the routine of the processing by the setting change instruction reception unit 210 in the client system 200 is shown by the flow chart of FIG. 9. As shown in the figure, at step 502 the setting change instruction reception unit 210 first receives the above-mentioned notification of setting change content sent from the access point 100 (FIG. 8). Next, at step 504, a response to the effect of receiving the notification of setting change content is sent to the access point 100.

Returning to FIG. 7, the wireless LAN setting change instruction unit 120 in the access point 100 executes the above-mentioned step 404, then the routine proceeds to step 406. At step 406, a response from the client system 200 is awaited. At the next step 408, it is judged if all of the client systems have sent the above-mentioned responses. When the result of judgment is YES, the routine proceeds to step 414, while when the result of judgment is NO, the routine proceeds to step 410.

At step 410, it is judged if a predetermined response waiting time has elapsed. When it has not elapsed, the routine returns to step 406, while when it has elapsed, the routine proceeds to step 412. At step 412, processing is performed for recording the not responding client systems in the memory, then the routine proceeds to step 414.

At step 414 executed next after step 408 or 412, all of the responding client systems 200 are sent a notification of setting change timing. The data structure of the notification of setting change timing is shown in FIG. 10. As shown in this drawing, the notification of setting change timing is comprised of a header showing that it is a notification of setting change timing and a setting change timing data reflecting the content of the new settings already sent.

On the other hand, the setting change instruction reception unit 210 in the client system 200 executes step 504 of FIG. 9, then the routine proceeds to step 506. At step 506, a notification of setting change timing from the access point 100 is awaited. At the next step 508, it is judged if the access point 100 has sent a notification of setting change timing. When the result of judgment is YES, the routine proceeds to step 510, while when the result of judgment is NO, the routine returns to step 506.

At step 510, the setting change instruction reception unit 210 starts up the client system side setting content update unit 220. The started up client system side setting content update unit 220 performs processing to update the wireless LAN setting content in the client system 200 at the timing of the setting change designated by the notification of setting change timing based on the setting content designated by the notification of setting change content. This completes the processing for changing the setting contents at the client system side.

Returning again to FIG. 7, the wireless LAN setting change instruction unit 120 in the access point 100 executes the above-mentioned step 414, then the routine proceeds to step 416. At step 416, the wireless LAN setting change instruction unit 120 starts up the access point side setting content update unit 130. The started up access point side setting content update unit 130 performs processing for updating the wireless LAN setting contents in the access point 100 at the time of a setting change designated by the notification of setting change timing based on the setting content designated by the notification of setting change content. Therefore, in principle, all of the wireless LAN settings in the network are simultaneously changed.

At the last step 418, the wireless LAN setting change instruction unit 120 reports the results of the current setting change to the setting change history management unit 140. The setting change history management unit 140 receiving the report performs processing to reflect the setting change timing and the success of the setting changes in the client systems as the setting change history information in the setting change history database 170.

An example of the data structure of this setting change history database 170 is shown in FIG. 11. As shown in the figure, the setting change history database 170 stores a history ID, setting change timing, SSID, encryption scheme, WEP key, key number, successful client names, and failed client names for each setting change.

Figure 12:
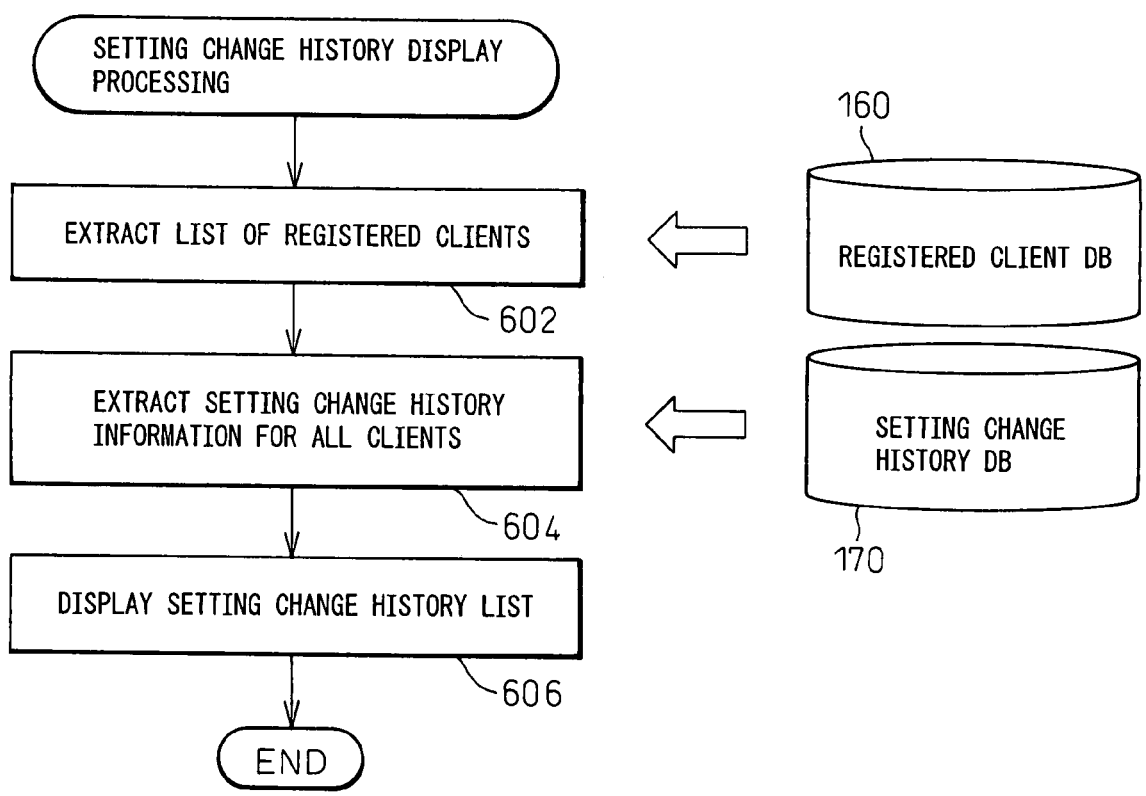
FIG. 12 is a flow chart showing the routine of setting change history display processing by a setting change history management unit in the access point.

Further, the setting change history management unit 140 also performs processing for displaying a list display screen of the setting change history information on the display system of any client system. A routine of the setting change history display processing is shown in the flow chart of FIG. 12. This processing is started based on a user input operation in any client system 200.

First, at step 602, a list of registered clients is extracted from the registered client database 160 (FIG. 4). Next, at step 604, the setting change history information for all of the client systems is extracted from the setting change history database 170 (FIG. 11). Finally, at step 606, based on the extracted information, the list of the setting change history is displayed on the display system of the client system 200.

An example of the displayed setting change history list is shown in FIG. 13. As illustrated in the figure, the setting change history list shows the timings of a past predetermined number of setting changes and whether the client systems succeeded or failed to be changed in settings at the times of each of the setting changes.

Further, in the setting change history list shown in FIG. 13, the client systems failed to be changed in settings are displayed with setting change buttons attached to the client names. Further, by a button being pushed by the user, the current latest setting content is automatically changed to.

In the example of FIG. 13, when the setting change button of the terminal "Fall" is pushed, the latest information in the successful setting changes in the history (in this example, the content of the one setting change before) is acquired from the setting history database 170, the content is temporarily changed to from the settings of the access point side, and connection with the terminal "Fall" is attempted.

Figure 14:
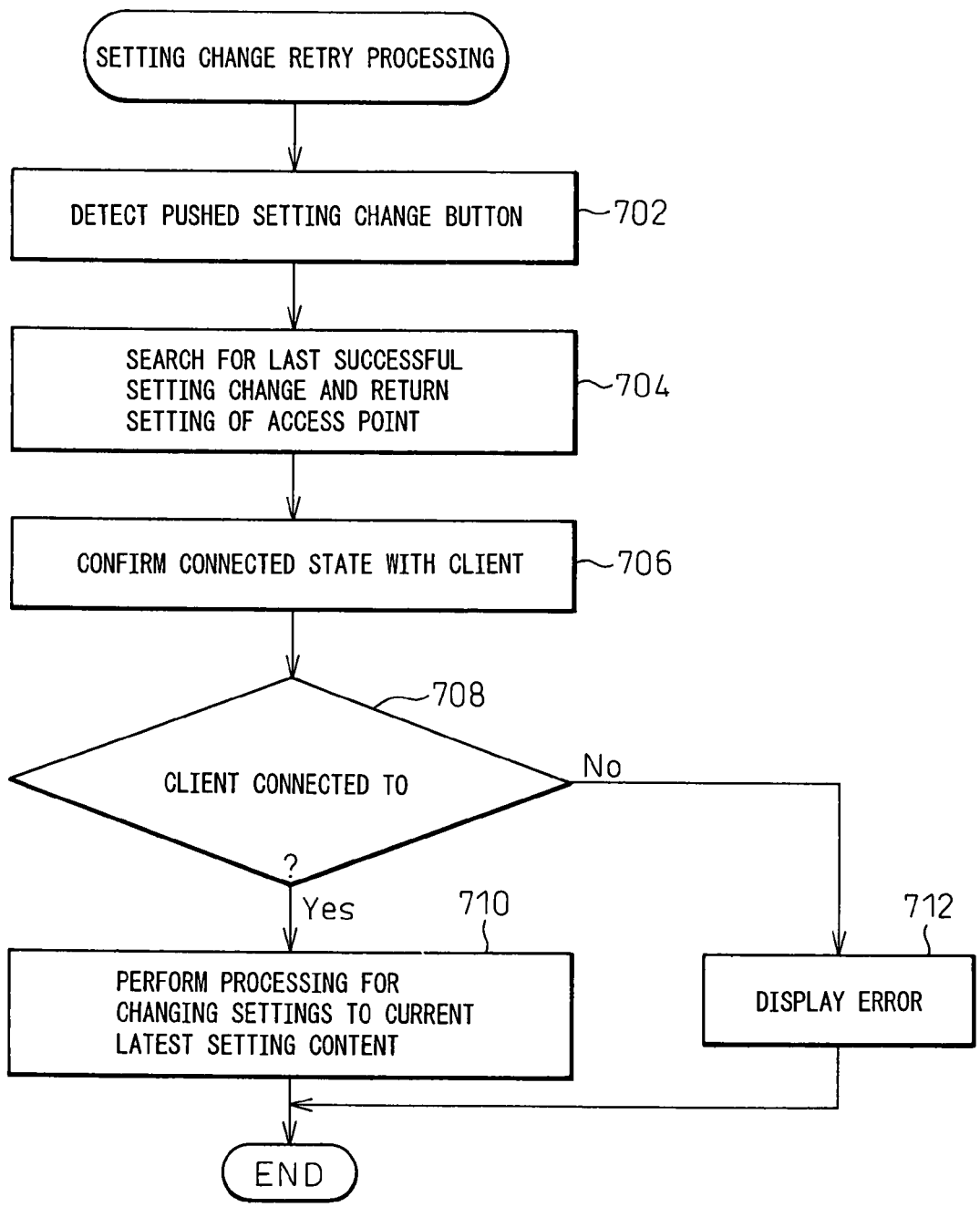
FIG. 14 is a flow chart showing the routine of setting change retry processing by a setting change history management unit in the access point.

This routine of the setting change retry processing performed by the setting change history management unit 140 is shown in the flow chart of FIG. 14. First, at step 702, the fact that a setting change button has been pushed at the display screen of the setting change history list is detected. Next, at step 704, the last successful setting change of the client associated with the pushed setting change button is searched for and the settings of the access point side are returned to that setting content.

Next, at step 706, the state of connection with the client system is confirmed. At step 708, whether connection has been successful or not is judged. When connection has been successful, the routine proceeds to step 710, where processing is performed to change the settings so that the settings of the client are also updated to the latest setting content on the network. This processing is similar to the processing shown in FIG. 7. On the other hand, when connection fails, the routine proceeds to step 712, where an error message to that effect is displayed.

Due to this setting change retry processing, the trouble of changing settings for later connection can be eliminated even for client systems which were not connected at the time of the original change of settings and for client systems failed in change of settings.

Figure 15:
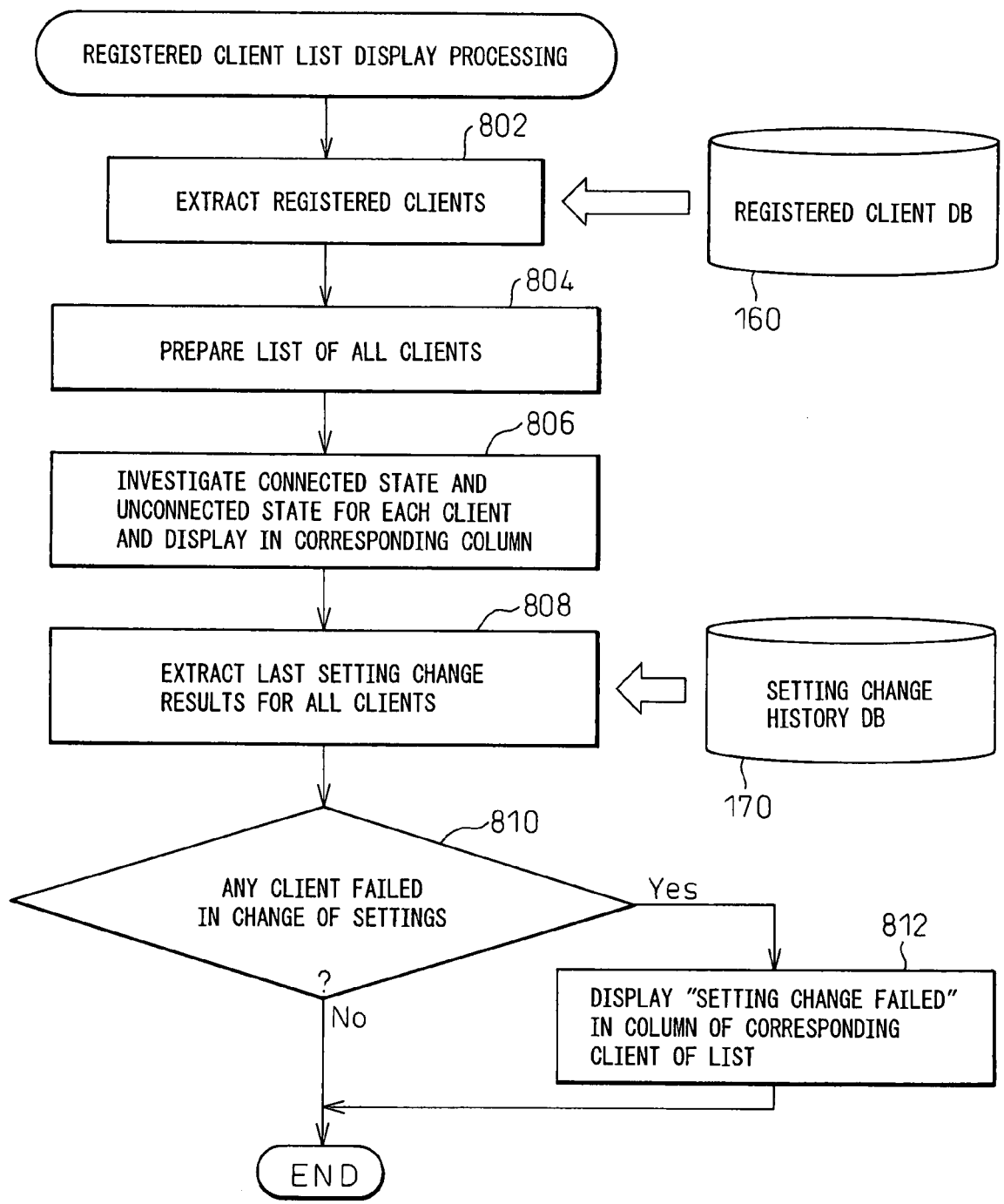
FIG. 15 is a flow chart showing the routine of the processing by a registered client list display unit in the access point.

Further, in the present embodiment, to enable the registered clients to be displayed in a list, the access point 100 is provided with a registered client list display unit 150 (FIG. 2). The routine of the processing by the registered client list display unit 150 is shown in the flow chart of FIG. 15. This processing is started up based on the user input operation at any client system 200.

First, at step 802, the registered clients are extracted from the registered client database 160 (FIG. 4). Next, at step 804, a list of all of the clients is prepared. Further, at the next step 806, whether each client is in the connected state or unconnected state is investigated and the results are displayed on the corresponding column of the list.

Next, at step 808, the results of the last setting changes are extracted for all of the clients from the setting change history database 170 (FIG. 11). Further, at step 810, whether there were any clients failed to be changed in settings the last time is judged. When the result of judgment is YES, the routine proceeds to step 812, where that effect is displayed in the corresponding column of the list for the failed clients.

An example of the registered client list displayed on the screen by the processing of the registered client list display unit 150 is shown in FIG. 16. According to the illustrated registered client list, the client system "Spring" was successfully changed in settings the last time and even now is in the connected state. Further, the client system "Summer" was successfully changed in settings the last time, but currently is powered down and is not connected. Further, the client system "Fall" failed to be changed in settings the last time and as a result is currently not connected due to the mismatch of settings.

By the registered client list being displayed in this way, the success of the setting change can be easily confirmed for all of the client systems. Therefore, the situation where the user does not notice a failure in settings can be reliably avoided.

The invention claimed is:

1. A wireless network system comprising:
   a control apparatus; and
   a plurality of wireless apparatuses that do not include the control apparatus, wherein
   said control apparatus includes:
      a data base including a registered wireless apparatus list for registering the wireless apparatus;
      a setting change instruction unit receiving a setting change request of the wireless network including change content from any one of the wireless apparatuses, extracting the registered wireless apparatus list from the database, and transmitting setting change instructions including the change content to all the wireless apparatuses based on the setting change request and the registered wireless apparatus list;
      a setting content update unit updating the wireless network setting content in said control apparatus with said change content; and
      a setting change history management unit managing setting change timings and success of setting changes at the wireless apparatuses for each of said setting change timings as setting change history information;
      a registered wireless apparatus list display unit displaying on a display system the registered wireless apparatus list showing the current connection state and the results of the last setting change for said plurality of wireless apparatuses, and
   each of said wireless apparatuses includes:
      a setting change instruction reception unit receiving a setting change instruction from said setting change instruction unit; and
      a content update unit updating the wireless network setting content in the wireless apparatus based on the setting change instruction received by said setting change instruction reception unit.

2. A wireless network system as set forth in claim 1, wherein said instruction for change by said setting change instruction unit is performed by first transmitting a notification of setting change content, then waiting until said plurality of wireless apparatuses have responded or a predetermined time has elapsed, then sending a notification of setting change timing.

3. A wireless network system as set forth in claim 1, wherein said setting change history management unit includes a setting change history displaying unit for displaying a list of setting change history information on a display system.

4. A wireless network system as set forth in claim 3, wherein said setting change history management unit includes a setting change retrying unit for executing processing for changing settings for a wireless apparatus failed to be changed in settings in accordance with an input operation on a display screen of said list of setting change history information.

5. A wireless network system as set forth in claim 4, wherein said setting change retrying unit executes setting change processing after returning the wireless network setting content in the control apparatus to the wireless network setting content in the wireless apparatus failed to be changed in settings.

6. A control apparatus comprising:
   a database including a registered wireless apparatus list for registering the wireless apparatuses;
   a setting change instruction unit receiving a setting change request of the wireless network including change content from any one of the wireless apparatuses in the network, extracting the registered wireless apparatus list from the database, and transmitting setting change instructions including the change content to all the remaining wireless apparatuses based on the setting change request and the registered wireless apparatus list;
   a setting content update unit updating wireless network setting content in said control apparatus with said change content;
   a setting change history management unit managing setting change timings and success of setting changes at the wireless apparatuses for each of said setting change timings as setting change history information; and
   a registered wireless apparatus list display unit displaying on a display unit the registered wireless apparatus list showing the current connection state and the results of the last setting change for said plurality of wireless apparatuses.

7. A control apparatus as set forth in claim 6, wherein said instruction for change by said setting change instruction unit is performed by first transmitting a notification of setting change content, then waiting until said plurality of wireless apparatuses have responded or a predetermined time has elapsed, then sending a notification of setting change timing.

8. A control apparatus as set forth in claim 7, wherein said setting change history management unit includes a setting change history displaying unit for displaying a list of setting change history information on a display system.

9. A control apparatus as set forth in claim 8, wherein said setting change history management unit includes a setting change retrying unit for executing processing for changing settings for a wireless apparatus failed to be changed in settings in accordance with an input operation on a display screen of said list of setting change history information.

10. A control apparatus as set forth in claim 9, wherein said setting change retrying unit executes setting change processing after returning the wireless network setting content in the control apparatus to the wireless network setting content in the wireless apparatus failed to be changed in settings.

11. A method of block conversion of the settings of a wireless network connecting a control apparatus and a plurality of wireless apparatuses that do not include the control apparatus, wherein
   said control apparatus executes:
      (a) a step of receiving a setting change request of the wireless network including change content from any one of the wireless apparatuses in the wireless network, extracting a registered wireless apparatus list from a database, and transmitting setting change instructions including the change content to all the wireless apparatuses based on the setting change request and the registered wireless apparatus list;
      (b) a step of updating wireless network setting content in said control apparatus with said change content;

(c) a step of managing setting change timings and success of setting changes at the wireless apparatuses for each of said setting change timings as setting change history information; and (d) a step of displaying on a display system a registered wireless apparatus list showing the current connection state and the results of the last setting change for said plurality of wireless apparatuses, and each of said wireless apparatuses executes:

(e) a step of receiving a setting change instruction sent at step (a); and (f) a step of updating the wireless network setting content in the wireless apparatus based on the setting change instruction received at step (e).

12. A method as set forth in claim 11, wherein step (a) is performed by first transmitting a notification of setting change content, then waiting until said plurality of wireless apparatuses have responded or a predetermined time has elapsed, then sending a notification of setting change timing.

13. A non-transitory computer readable medium having thereon a program to be run by a control apparatus in a wireless network to which a plurality of wireless apparatuses are connected, the control apparatus not being one of the plurality of wireless apparatuses, said program making said control apparatus function as:

a setting change instruction unit receiving a setting change request of the wireless network including change content from any one of the wireless apparatuses in the wireless network, extracting a registered wireless apparatus list from a database, and transmitting setting change instructions including the change content to all the wireless apparatuses based on the setting change request and the registered wireless apparatus list;

a setting content update unit updating the wireless network setting content in said control apparatus with said change content;

a setting change history management unit managing setting change timings and success of setting changes at the wireless apparatuses for each of said setting change timings as setting change history information; and a registered wireless apparatus list display unit displaying on a display unit the registered wireless apparatus list showing the current connection state and the results of the last setting change for said plurality of wireless apparatuses.

14. A method as set forth in claim 11, wherein step (c) includes:

(g) a step of displaying a list of setting change history information on a display system.

15. A method as set forth in claim 14, wherein step (c) further includes:

(h) a step of processing for changing settings for a wireless apparatus failed to be changed in settings in accordance with an input operation on a display screen of said list of setting change history information.

16. A method as set forth in claim 15, wherein step (h) executes setting change processing after returning the wireless network setting content in the control apparatus to the wireless network setting in the wireless apparatus failed to be changed in settings.

17. A non-transitory computer readable medium as set forth in claim 13, wherein said instruction for change by said setting change instruction unit is performed by first transmitting a notification of setting change content, then waiting until said plurality of wireless apparatuses have responded or a predetermined time has elapsed, then sending a notification of setting change timing.

18. A non-transitory computer readable medium as set forth in claim 13, wherein said setting change history management unit includes a setting change history displaying unit for displaying a list of setting change history information on a display system.

19. A non-transitory computer readable medium as set forth in claim 18, wherein said setting change history management unit includes a setting change retrying unit for executing processing for changing settings for a wireless apparatus failed to be changed in settings in accordance with an input operation on a display screen of said list of setting change history information.

20. A non-transitory computer readable medium as set forth in claim 19, wherein said setting change retrying unit executes setting change processing after returning the wireless network setting content in the control apparatus to the wireless network setting content in the wireless apparatus failed to be changed in settings.

* * * * *